United States Patent [19]

Cooper et al.

[11] 3,900,445

[45] Aug. 19, 1975

[54] PROCESS FOR THE PREPARATION OF POLYPHENYLENE ETHERS WITH CUPROUS AND CUPRIC AMINE CATALYST

[75] Inventors: Glenn D. Cooper; James G. Bennett, both of Delmar, N.Y.

[73] Assignee: General Electric Company, Pittsfield, Mass.

[22] Filed: Dec. 26, 1973

[21] Appl. No.: 428,449

[52] U.S. Cl. .............................................. 260/47 ET
[51] Int. Cl.² ............................................ C08G 65/44
[58] Field of Search ................................. 260/47 ET

[56] References Cited
UNITED STATES PATENTS

| | | | |
|---|---|---|---|
| 3,306,874 | 2/1967 | Hay | 260/47 |
| 3,306,875 | 2/1967 | Hay | 260/47 |
| 3,787,358 | 1/1974 | Nishioka et al. | 260/47 |

FOREIGN PATENTS OR APPLICATIONS

| | | |
|---|---|---|
| 44-28512 | 11/1969 | Japan |
| 341,814 | 7/1972 | U.S.S.R. |

*Primary Examiner*—Melvin Goldstein
*Attorney, Agent, or Firm*—William F. Mufatti; Edward A. Hedman; James V. Costigan

[57] ABSTRACT

A novel process is disclosed for the preparation of polyphenylene ethers by the oxidative coupling of a phenol in the presence of a cuprous and cupric copperamine catalyst.

12 Claims, No Drawings

PROCESS FOR THE PREPARATION OF POLYPHENYLENE ETHERS WITH CUPROUS AND CUPRIC AMINE CATALYST

This invention provides a process for the oxidative coupling of a phenol to prepare polyphenylene ethers. A combined cuprous and cupric copper-amine catalyst is used to achieve an improved process.

BACKGROUND OF THE INVENTION

The polyphenylene ethers and processes for their preparation are known in the art and are described in numerous publications including the Hay patents, U.S. Pat. Nos. 3,306,874 and 3,306,875. Also the Bennett and Cooper patents, U.S. Pat. Nos. 3,639,656, 3,642,699, 3,661,848 and 3,730,944 (Bennett and Katchman) describe processes for the preparation of polyphenylene ethers. All of these patents are incorporated by reference.

In general, the prior art processes involve the oxidative self-condensation of a monovalent phenolic precursor using oxygen and a catalyst comprising a cuprous copper amine complex or a cupric copper amine complex. Phenols which are polymerized by the process are monovalent phenols having substitution in at least the two ortho positions and hydrogen or halogen in the para position. By way of illustration, they correspond to Formula I:

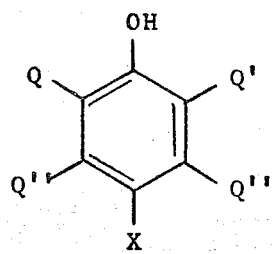

wherein X is a substituent selected from the group consisting of hydrogen, chlorine, bromine and iodine, Q is a monovalent substituent selected from the group consisting of hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' and Q'' are the same as Q and in addition, halogen, with the proviso that Q, Q' and Q'' are all free of a tertiary alpha-carbon atom. Polymers formed from the above-noted phenols will therefore correspond to Formula II:

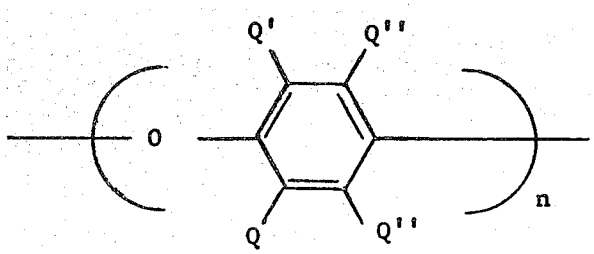

where the oxygen ether atom of one repeating unit is connected to the phenylene nucleus of the next repeating unit; Q, Q' and Q'' are as above defined; and $n$ is a whole integer equal to at least 50.

According to the process of the Hay patents, the formation of the polyphenylene ethers involves the self-condensation of the phenolic compound in the presence of oxygen and a catalyst system comprising an amine-basic salt complex. Various methods are reported for forming the complex catalysts starting with the copper salts. For example, a reducing agent can be used with a cupric salt to form the cuprous salt in situ, which in turn forms the amine-basic salt complex when admixed with the amine. Alternatively, the complex can be formed between an amine and a basic cupric salt formed by reacting cupric salts with an alkaline salt of a phenol, by treating a cupric salt with an ion exchange resin having exchangeable hydroxyl groups, by adding a base to a cupric salt, or by adding cupric hydroxide to a cupric salt. For full details regarding the preparation of such complexes from copper salts and amines and their use in the oxidative coupling of phenols, reference is made to the abovementioned Hay, or Bennett and Cooper patents.

The prior art processes have employed either a cuprous or cupric copper salt in the oxidative coupling of phenols. It has now been discovered that the use, in combination, of a cuprous and cupric copper salt in the above-described reaction has a number of advantages over the use of either a cupric or cuprous copper salt by itself.

An advantage of this process resides in the fact that the initial rate of polymerization is increased while the initial oxygen concentration in the vapor space is reduced. This initial surge of oxygen relates to a poor utilization of oxygen which occurs during the rapid polymerization phases which take place in the early stages of the reaction.

Therefore, it is a principal object of the invention to provide a process for the oxidative coupling of a phenol which is more efficient in the utilization of oxygen.

It is also an object of this invention to provide a process for the manufacture of polyphenylene ethers which has a minimum impact on the environment by reducing initial oxygen surge and thereby reducing the venting of solvent vapors into the atmosphere.

It is also an object of the present invention to provide a process which results in a reduced amount of the highly colored by-product of the oxidative coupling of phenols, i.e., tetramethyldiphenoquinone.

DESCRIPTION OF THE INVENTION

In particular, this invention is an improvement in process for the preparation of high molecular weight polyphenylene ethers having a degree of polymerization of at least 50 by oxidatively coupling a monovalent phenol having substitution in at least the two ortho positions and hydrogen or halogen in the para position, using oxygen and a complex catalyst as an oxidizing agent. The process is characterized by the use of a cuprous copper and a cupric copper salt in combination with a primary, secondary of tertiary amine.

Typical examples of cuprous salts that may be employed in the present invention include cuprous chloride, cuprous bromide, cuprous sulfate, cuprous azide, cuprous tetramine sulfate, cuprous acetate, cuprous toluate, and the like. Typical examples of cupric salts include cupric chloride, cupric bromide, cupric sulfate, cupric azide, cupric tetramine sulfate, cupric acetate, cupric butyrate, cupric toluate and the like. Preferred cuprous and cupric salts are the halides, cuprous bromide and cuprous chloride and cupric bromide and cupric chloride.

The total amount of copper salts are desirably maintained low and preferably varies from 0.2 to 2.5 moles per 100 moles of monovalent phenol when a primary or secondary amine is employed as the amine component of the catalyst. When a tertiary amine is employed, the total amount of copper salts are preferably employed in an amount providing from about 4 to about 15 moles per 100 moles of the monovalent phenol. The relative ratio of cuprous to cupric copper salt is not critical and may vary from 0.1:1 to 1:0.1. The preferred ratio is from about 0.5:1 to 1:0.5.

The improved process of this invention is broadly applicable to all of the phenols disclosed in the above-mentioned Hay or Bennett and Cooper patents, but is is preferably used with the phenols of Formula I. The most preferred phenols for purposes of the present invention are those of Formula I, wherein Q and Q' are hydrocarbon radicals having from 1 to 8 carbon atoms and Q'' are each hydrogen. Illustrative of such preferred phenols are 2,6-dimethylphenol, 2,6-diethylphenol, 2-methyl-6-ethylphenol, 2-methyl-6-allylphenol, 2-methyl-6-phenylphenol, 2,6-diphenylphenol, 2,6-dibutylphenol and 2-methyl-6-propylphenol. Especially preferred as a phenolic starting material is 2,6-dimethylphenol.

The primary, secondary or tertiary amine component of the catalyst complex corresponds to those disclosed in the above-mentioned Hay patents. Illustrative members include aliphatic amines, including aliphatic mono- and di-amines, where the aliphatic group can be straight or branched chain hydrocarbon or cycloaliphatic. Preferred are aliphatic monoamines. Especially preferred are mono-, di- and tri (lower alkyl amines, the alkyl groups having from 1 to 12 carbon atoms. Typically, there can be used mono-, di- and tri-methyl, ethyl, n-propyl, i-propyl, n-butyl substituted amines, mono- and di-cyclohexylamine, N,N'-dialkylethylenediamines, the N',N'-dialkylpropanediamines, the N,N,N'-trialkylpentanediamines, dimethyl lauryl amines, and the like.

Mixtures of such primary, secondary and tertiary amines may be used if desired. A preferred mono (lower) alkyl amine is N-butylamine; a preferred di(-lower) alkyl amine is di-n-butylamine; and a preferred tri(lower) alkylamine is triethyl amine. The concentration of primary and secondary amine in the reaction mixture vary within wide limits, but is desirably added in low concentrations. A preferred range comprises from about 2.0 to 25.0 moles of amine per 100 moles of phenol. In the case of a tertiary amine, the preferred range is considerably higher, and comprises from about 500 to about 1500 moles of monovalent phenol.

The polymerization reaction is preferably performed in a solvent. Suitable solvents are disclosed in the above noted Hay patents. Aromatic solvent such as benzene, toluene, o-dichlorobenzene and xylene are especially preferred, although tetrachloromethane, trichloromethane, dichloromethane, 1,2-dichloroethane, trichloroethylene, dichloroethylene and halogenated hydrocarbons, in general may also be used.

In a preferred manner of proceeding, a suitable reaction vessel is charged with the solvent, the copper salts and the amine. The mixture is stirred for a short time, sufficient to mix the ingredients, e.g., 5 minutes, then the promoter is added. Then the phenolic precursor is added and well mixed. Oxygen is next passed into the stirred mixture for the desired period, e.g., 120 minutes, and the reaction temperature is maintained at between 15° and 30°C., preferably at about 25°C., cooling if necessary, Polymerization is terminated in a known way, e.g., by adding aqueous acetic acid. The product is recovered in a known way, e.g., by separating the aqueous acid layer by centrifugation and adding a non-solvent for the polymer, e.g., methanol, to the organic layer until the polyphenylene ether has been substantially completely precipitated. The polymer is reslurried in a non-solvent, e.g., methanol, and vacuum dried. The theoretical yield is calculated from the polymer weight. The degree of polymerization, i.e., relative molecular weight, may be correlated to the intrinsic viscosity. This is determined in a known way, e.g., by measuring the viscosity of a dilute chloroform solution of the polymer at 30°C.

The polyphenylene ethers prepared by the process of this invention are useful for all the purposes disclosed in the above-mentioned Hay patents. For example, they can be used in molded articles or in films, tapes and the like. They may be mixed with other resins, or various fillers, reinforcements, dyes, pigments, stabilizers, plasticizers and the like.

DESCRIPTION OF THE PREFERRED EMBODIMENTS

The following examples illustrate the process of this invention. They are merely illustrative and are not to be construed to limit the invention in any manner whatsoever.

EXAMPLE 1

Catalyst solution was prepared by stirring 0.41 g of cupric bromide and 10.9 g of di-n-butyl amine in 100 ml of toluene. The catalyst was transferred to a one liter glass stirred reactor equipped with an internal cooling coil and inlet tubes for oxygen and monomer. A rapid stream of oxygen was introduced near the bottom of the reactor and a solution of 70 g of 2,6-xylenol in 100 ml of toluene was added through a metering pump, over a period of fifteen minutes, to the rapidly stirred solution. The temperature was maintained at 30°C by circulating water from a constant temperature bath through the cooling coil. At 60, 90 and 120 minutes after the beginning of monomer addition samples of the reaction mixture were withdrawn, stirred with a small amount of 50% aqueous acetic acid, centrifuged, and the polymer solution was decanted. The polymer was precipitated by addition of methanol, filtered, washed with methanol, and dried under vacuum. Intrinsic viscosities were measured in chloroform solution at 30°C.

EXAMPLE 2

This was carried out as in Example 1, except that the cupric bromide was replaced by 0.41 g of cuprous bromide.

EXAMPLE 3

This was carried out as in Example 1, except that the cupric bromide was replaced by a mixture of 0.205 g of cupric bromide and 0.205 g of cuprous bromide.

The results of Examples 1-3 are listed in Table 1. The time required for production of polymer with molecular weight suitable for molding application (approximately 0.55 dl/g) is shorter with a mixture of cuprous and cupric bromide than with cuprous bromide alone. Polymerization time was equal to the time required with cupric bromide alone, but less of the highly colored by-product, tetramethyldiphenoquinone was produced with the mixture of cuprous and cupric bromide.

TABLE 1

| Example | Catalyst | 60 min. | I. V. (dl/g) 90 min. | 120 min. |
|---|---|---|---|---|
| 1 | CuBr$_2$ (0.41g) | .29 | .48 | .57 |
| 2 | CuBr (0.41g) | .21 | .37 | .46 |
| 3 | CuBr (0.205g)+ CuBr$_2$ (0.205g) | .34 | .49 | .56 |

Examples 4 and 5 illustrate the effect of replacing part of the cupric chloride by cuprous chloride in polymerizations carried out with a catalyst prepared from copper chloride, dibutyl amine, and sodium bromide. The weight ratio of xylenol: copper halide: sodium bromide was 100:0. 55:0.85 in each case.

EXAMPLE 4

The general procedure employed was that described in Example 1. The catalyst was prepared by stirring cupric chloride, dibutyl amine, and sodium bromide in toluene in a stainless-steel reaction vessel. The xylenol solution was added through a metering pump over a period of 35 minutes, with oxygen added near the bottom of the vessel at a rate sufficient to deliver during this period 5% more than the amount required for complete conversion of the xylenol to polymer. Nitrogen was introduced over the surface of the reaction mixture, at a rate equal to 40% of the oxygen flow rate, and samples of the gas issuing from the reactor vent were analyzed for oxygen. The oxygen concentration in the vent gas increased rapidly during the first ten minutes of reaction, reaching a maximum of 50%. At 140 min. after the start of the reaction a sample was withdrawn and the polymer isolated as described in Example 1. The intrinsic viscosity of the polymer was 0.56 dl/g.

EXAMPLE 5

This was carried out as described in Example 4, except that the cupric chloride was replaced by an equal weight of a mixture of equal weights of cuprous chloride and cupric chloride. The maximum oxygen concentration observed in the vent gas was only 20%. The polymer isolated after 140 minutes had an intrinsic viscosity of 0.55 dl/g, and the reaction mixture contained much less precipitated tetramethyldiphenoquinone than the reaction mixture obtained with cupric chloride alone.

Comparison of Examples 4 and 5 shows that replacement of part of the cupric chloride with the less expensive cuprous chloride causes no reduction in the overall polymerization rate, but greatly increases the oxygen utilization in the early stages of the reaction. In addition to lowering the cost of catalyst and oxygen, the lower oxygen concentration in the vapor space reduces the risk of fire or explosion in the reactor. The faster initial rate with the mixed catalyst also results in less accumulation of unreacted monomer and a reduction in the amount of tetramethyldiphenoquinone produced.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

We claim:
1. In a process for the preparation of a high molecular weight polyphenylene ether having a degree of polymerization of at least 50 by oxidatively coupling a monovalent phenol having substitution in at least the two ortho positions and hydrogen or halogen in the para position, using oxygen and a complex catalyst as an oxidizing agent, the improvement which comprises using as said complex catalyst a mixture of a cuprous halide salt and a cupric halide salt at a ratio of from 0.1:1 to 1:0.1 of said cuprous halide to said cupric halide, in combination, with a primary, or secondary amine.

2. A process as defined in claim 1 wherein said polyphenylene ether is of the formula

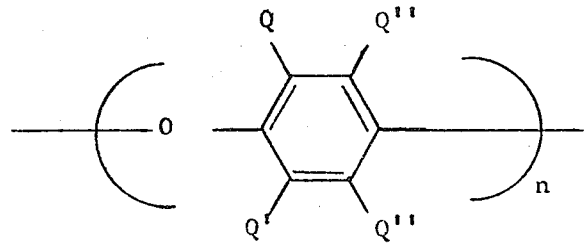

where Q is a hydrocarbon radical, a halohydrocarbon radical having at least two carbon atoms between the halogen atom and the phenol nucleus, a hydrocarbonxoy radical or a halohydrocarbonoxy radical having at least two carbon atoms between the halogen atom and the phenol nucleus; Q' and Q'' are the same as Q and, in addition, halogen, provided that Q, Q' and Q'' are all free of a tertiary carbon atom and n is at least 50.

3. A process as defined in claim 2 wherein Q and Q' are hydrocarbon radicals having from 1 to 8 carbon atoms and Q'' are each hydrogen.

4. A process as defined in claim 3 wherein Q and Q' are each methyl radicals.

5. A process as defined in claim 1 wherein said halide is a chloride or a bromide.

6. A process as defined in claim 1 wherein said halide is a chloride or a bromide.

7. A process as defined in claim 1 wherein said amine is an aliphatic monoamine.

8. A process as defined in claim 7 wherein said amine is a mono(lower) alkyl amine.

9. A process as defined in claim 8 wherein said amine is n-butyl amine.

10. A process as defined in claim 7 wherein said amine is a di-(lower) alkyl amine.

11. A process as defined in claim 10 wherein said amine is di-n-butyl amine.

12. In a process for the preparation of a high molecular weight polyphenylene ether having a degree of polymerization of at least 50 by oxidatively coupling a monovalent phenol having substitution in at least the two ortho positions and hydrogen or halogen in the para position, using oxygen and a complex catalyst as an oxidizing agent, the improvement which comprises using as said complex catalyst a mixture of cuprous chloride and cupric chloride at a ratio of from 0.5:1 to 1:0.5 in combination with a di-(lower) alkyl amine.

* * * * *